United States Patent [19]

Tanaka et al.

[11] Patent Number: 4,800,490
[45] Date of Patent: Jan. 24, 1989

[54] BUFFER STORAGE CONTROL SYSTEM HAVING A PRIORITY CIRCUIT

[75] Inventors: Tsutomu Tanaka, Yokohama; Yuji Oinaga, Tokyo, both of Japan

[73] Assignee: Fujitsu Limited, Kawasaki, Japan

[21] Appl. No.: 924,329

[22] Filed: Oct. 29, 1986

[30] Foreign Application Priority Data

Oct. 29, 1985 [JP] Japan .................................. 60-241799

[51] Int. Cl.[4] ............................................ G06F 12/00
[52] U.S. Cl. .................................................... 364/200
[58] Field of Search ............................. 364/200, 900

[56] References Cited

U.S. PATENT DOCUMENTS 4,500,954 2/1985 Duke et al. ........................ 364/200

Primary Examiner—Raulfe B. Zache
Attorney, Agent, or Firm—Staas & Halsey

[57] ABSTRACT

A buffer storage control system is provided having a central processing unit having a buffer storage for storing a part of the content of a main storage, wherein, when a block transfer from the main storage to the buffer storage is carried out, data to be processed is transferred directly to an arithmetic unit or an instruction processing unit via a by-pass operation. The transferred data is then written into the buffer storage and only the portion written in a block can be read, even if not all of the data of one block is written into the buffer storage. During the period from the end of the by-pass operation to the end of the write operation into the buffer storage, with respect to data related to the by-pass operation and data transferred from the main storage, subsequent to the data related to the by-pass operation, the access to the buffer storage based upon a subsequent request for access is inhibited.

6 Claims, 6 Drawing Sheets

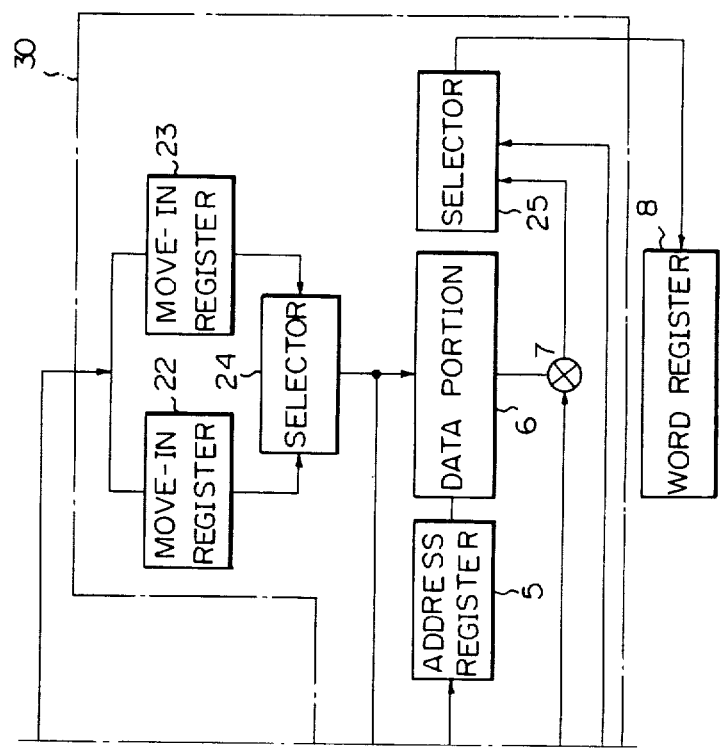

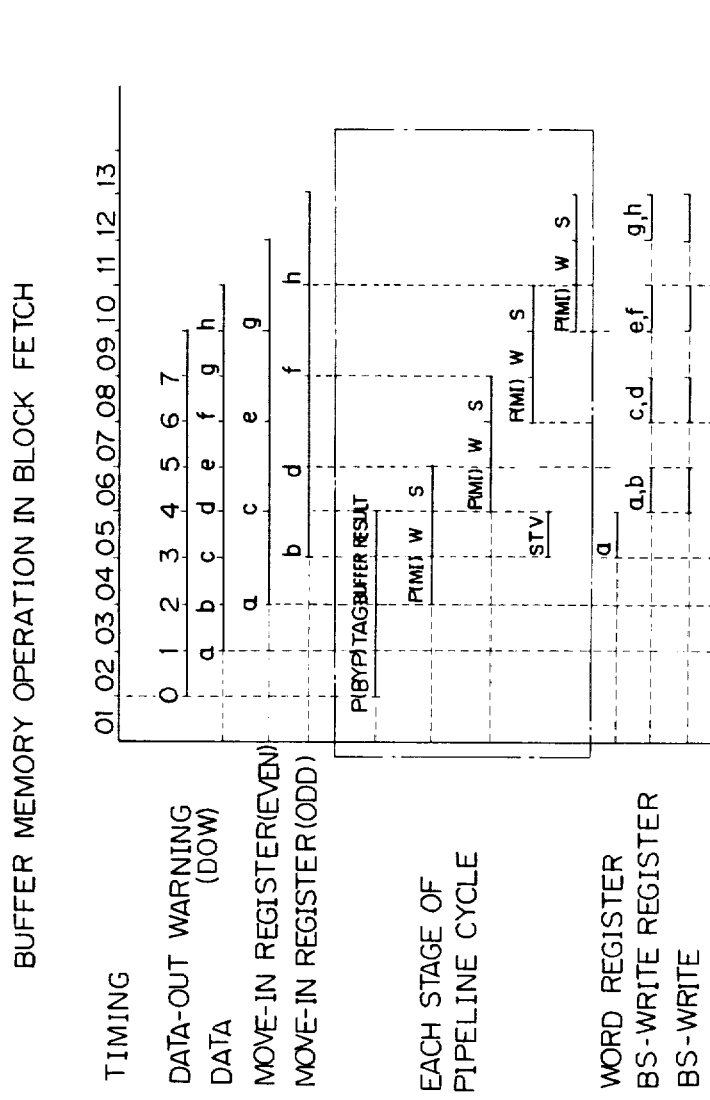

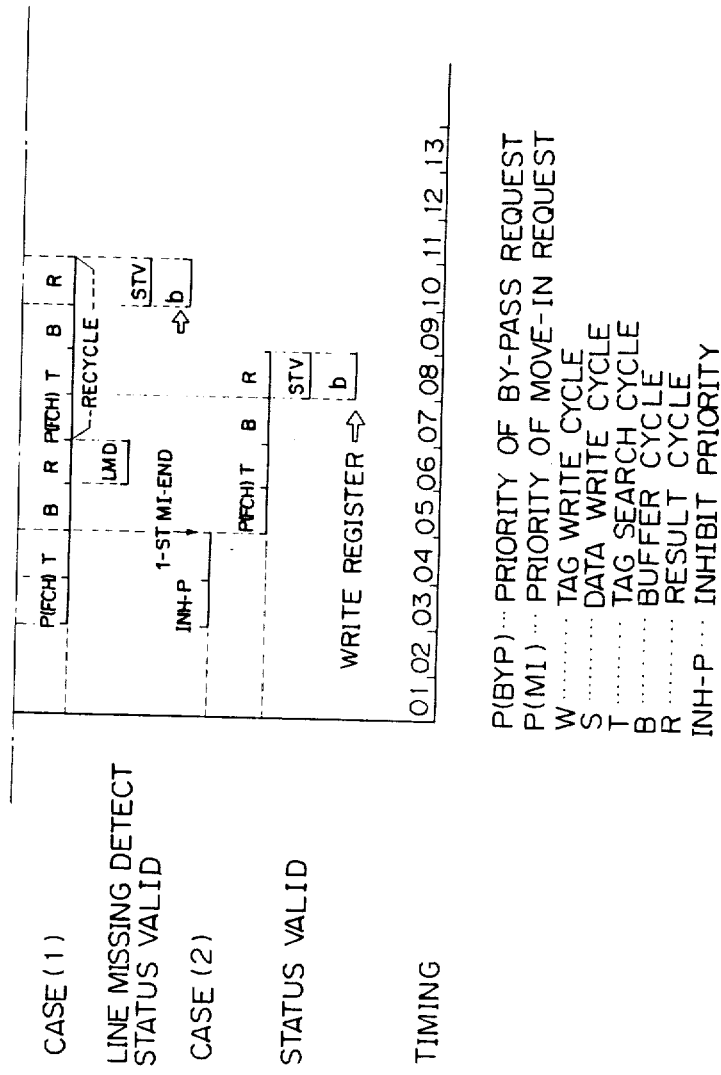

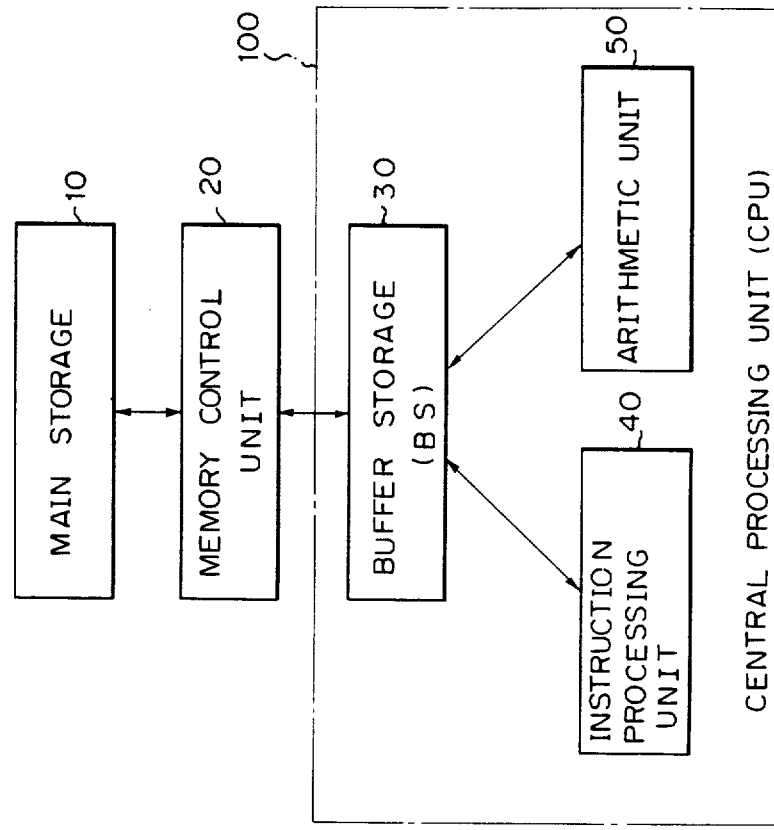

BUFFER STORAGE CONTROL SYSTEM HAVING A PRIORITY CIRCUIT

BACKGROUND OF THE INVENTION

The present invention relates to a buffer storage control system, and more particularly, to a buffer storage control system having a priority circuit for requesting access of a buffer storage provided with such a circuit to prohibit acceptance of requests other than a by-pass request and a move-in request.

In general, a buffer storage control system mainly includes a central processing unit, a main storage, a memory control unit, a buffer storage, an instruction processing unit, and an arithmetic unit. When a data fetch request from, for example, an arithmetic unit, is accepted, the buffer storage checks whether or not the desired data exists in the buffer storage itself. If the data exists, the desired data is sent to the arithmetic unit, but if the desired data is not present, a request for one block of data, containing the required data, is sent to the main storage. When the requested data is delivered from the main storage unit through the memory control unit, the buffer storage delivers the requested data to the arithmetic unit, and in consequence, the relevant data and the next data, that is, one block of data containing by-pass data, are stored into the buffer storage itself.

The term by-pass operation means that in a block transfer, directly necessary data is not written in a buffer storage, but transferred to an instruction processing unit or an arithmetic unit, and the term move-in operation means that data for a block transfer is written in a buffer storage.

In the prior art, when the buffer storage has finished the by-pass operation, it can accept a next access request. Therefore, if the first move-in operation is not finished, when the next access address is requested in case the by-pass action and the next access address continues after another in succession, a missing-hit data or a Line Missing Detect (LMD) data in the next access is often produced to enter into a recycle sequence (Refer to FIG. 3). The term recycle sequence means that one action cannot be finished due to some cause and must be done over again.

SUMMARY OF THE INVENTION

It is an object of the present invention to provide an improved buffer storage control system for inhibiting entrance to a recycle sequence in order to improve the performance of a data processor.

According to the present invention, there is provided a buffer storage control system having a central processing unit including a buffer storage for storing a part of the content of a main storage therein, the system being adapted to operate in such a manner that, when a block transfer from the main storage to the buffer storage is carried out, data to be processed is transferred directly to an arithmetic unit or an instruction processing unit via a by-pass operation. The transferred data is then written into the buffer storage and only the portion written in the block can be read, when not all of the data of one block is written into the buffer storage. During the period from the end of the by-pass operation to the end of the write operation into the buffer storage, with respect to data related to the by-pass operation and data transferred from the main storage subsequent to the data related to the by-pass operation, the access to the buffer storage based upon a subsequent request for access is inhibited.

In other words, with respect to the buffer storage control system according to the present invention, a circuit which inhibits acceptance of all requests other than a by-pass request and a move-in request, is attached to a priority circuit processing requests for access to the buffer storage. The circuit inhibits these other requests during the period from the generation of a by-pass request to the generation of a first move-in request.

BRIEF DESCRIPTION OF THE DRAWINGS

FIGS. 2A and 2B represent a block diagram showing an example of the configuration of a buffer storage according to the present invention;

FIGS. 3A and 3B represent a timing chart for explaining the block fetch operation of the buffer storage according to FIG. 2A and 2B; and FIG. 4 is a block diagram showing the outline of the buffer memory.

DETAILED DESCRIPTION OF THE PREFERRED EMBODIMENTS

The present invention will now be described in detail with reference to the drawings.

Figure 1:
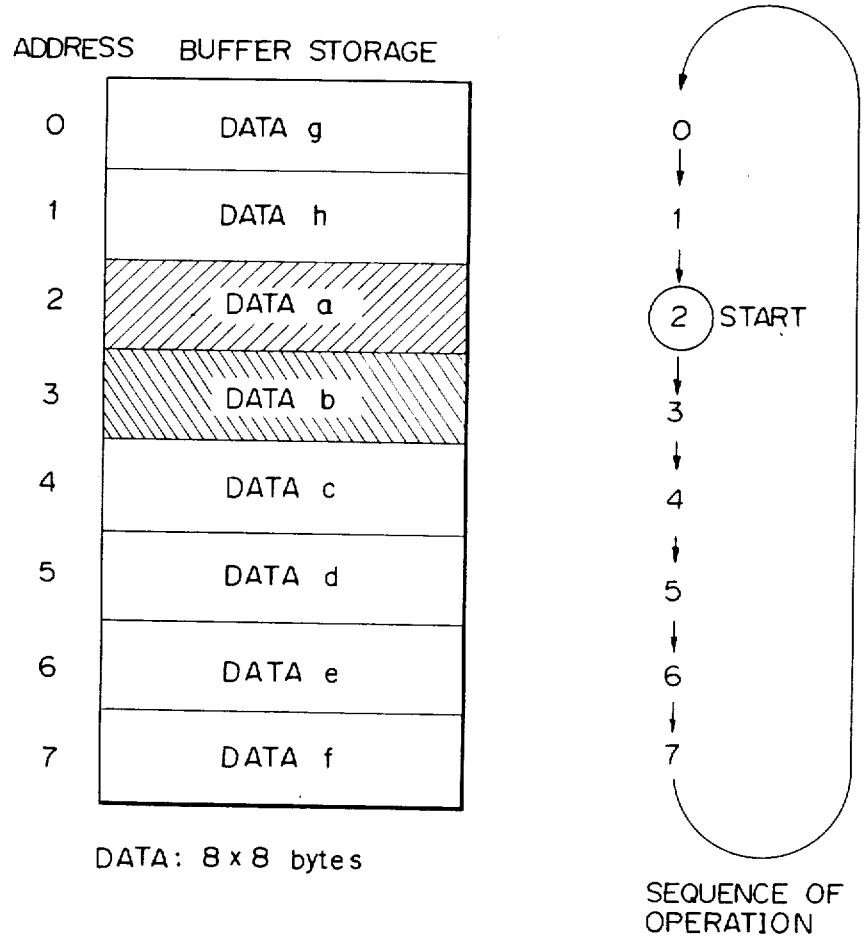
FIG. 1 is a diagram showing the configuration of a block of data.

FIG. 1 is a diagram showing the configuration of a block of data in which one block includes, for example, 64 bytes of data. When a block fetch is requested, a block of data is divided into data units, each having an 8 byte length, and these units are transferred in turn. In this case, a request data is transferred at the start. Thus, supposing that the request data is the second unit in the block, first the No. 2 data unit is transferred and then the No. 3 data unit is transferred, and then the remaining units are transferred in the following order, No. 4, No. 5, No. 6, No. 7, No. 0 and No. 1.

FIG. 4 is a block diagram explaining the function of a buffer storage. In FIG. 4, CPU 100 denotes a central processing unit, 10 a main storage, 20 a memory control unit, 30 a buffer storage, 40 an instruction processing unit, and 50 an arithmetic unit, respectively.

When the buffer storage 30 receives a data fetch request from the arithmetic unit 50, the buffer storage 30 checks whether or not the desired data exists in the buffer storage 30. If the desired data exists, it is sent to the arithmetic unit 50. If the desired data does not exist, the buffer storage 30 requests one block of data containing the required data from the main storage 10.

When the requested block of data is delivered from the main storage 10 through the memory control unit 20, the buffer storage 30 delivers the requested block of data directly to the arithmetic unit 50 (called a by-pass action), and then the requested data and the successively delivered data, that is to say, one block of data containing the by-pass data, are stored into the buffer storage 30.

In general, the buffer storage 30, the instruction processing unit 40, and the arithmetic unit 50 are arranged within the central processing unit 100.

Figure 2A:
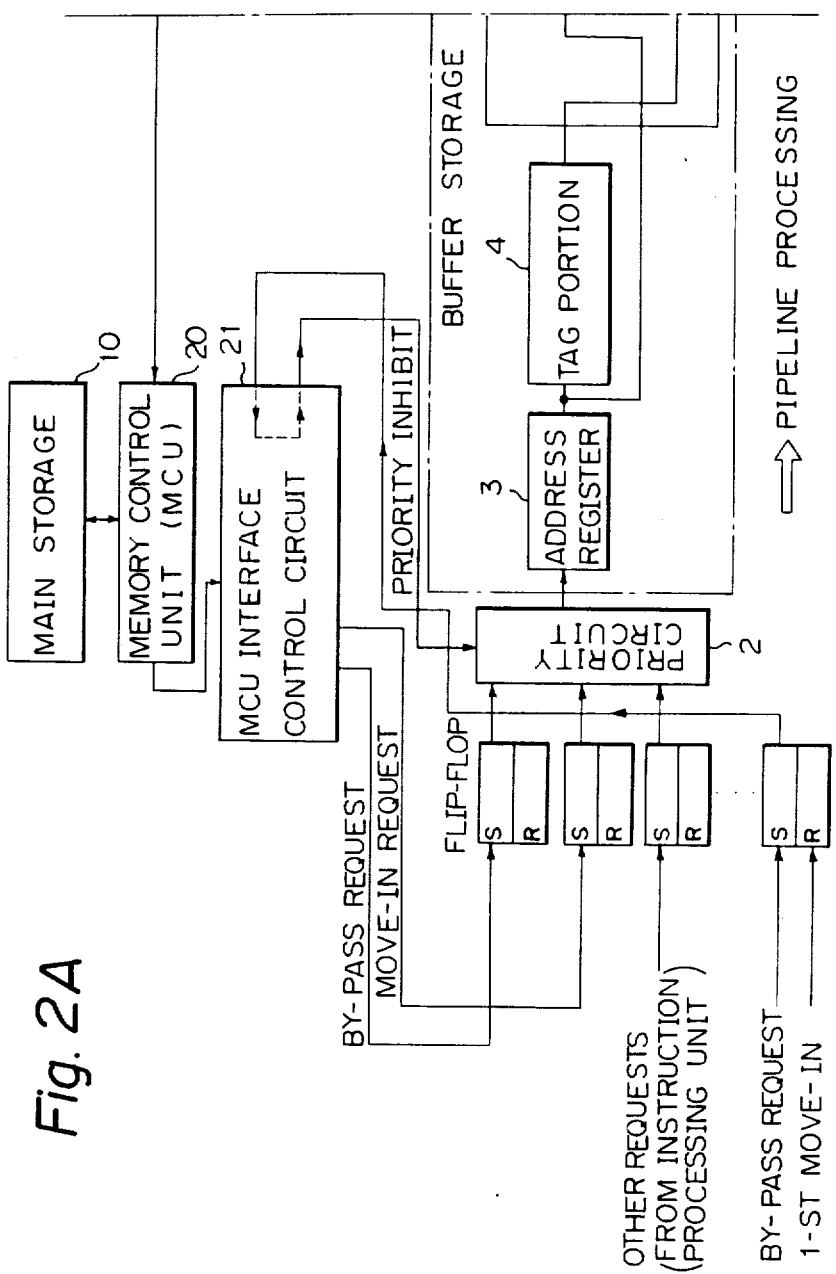

FIGS. 2A and 2B represent a block diagram showing one example of the configuration of a buffer storage 30. FIGS. 2A and 2B reference numerals 22, 23 denote move-in registers, 24 denotes a selector, 2 denotes a priority circuit, 3 an address register, 4 a tag portion, 5 an address register, 6 a data portion, 7 a gate, 8 a word register, 25 a selector, 20 a memory control unit (MCU), and 21 an MCU interface control circuit.

A unit of data sent from a main storage 10 is set to a respective move-in register 22 and 23. A priority circuit 2 is used to select one request from among a plurality of requests according to an order of priority.

When a priority inhibit tag is set, requests other than a by-pass reqeust and a move-in request can not be accepted. A first address register 3 is provided for a tag portion 4. Address data and control data are stored in a tag portion 4 according to the data stored in a data portion 6, and a second address register 5 is provided for a data portion 6. Data (containing an instruction) is stored in the data portion 6. A gate 7 opens when the tag portion 4 outputs a coincidence signal, and sends data read out from the data portion 6 to a word register 8. The data to be transferred for an instruction processing unit 40 and an operation unit 50 and the like, is described in FIG. 4 and is set to the word register 8. A memory control unit (MCU) interface control circuit 21 receives data from the memory control unit 20, and this data is output as the by-pass request or move-in request signal and the priority inhibit signal. When not all of the data of one block is written in the buffer storage 30, in accordance with the present invention, buffer storage 30 can be read out only by the portion in which the block of data is written.

FIGS. 3A and 3B represent a timing chart for explaining the operation when a block fetch of the buffer storage is carried out. In general, when a data unit is transferred, the memory control unit 20 outputs a data-out warning (DOW). When a first data unit "a" is delivered, the data unit "a" is set to the move-in register 22 and the next data unit "b" is set to the move-in register 23 as shown in FIG. 2B. The first signal DOW is delivered, and the by-pass request signal is generated and input to the priority circuit 2.

P (BYP) shows that the by-pass request has been selected in the priority cycle. P (Mi) shows that the move-in request has been selected in the priority cycle. T denotes a tag search cycle, B a buffer cycle, R a result cycle, W a tag write cycle, and S a data write cycle.

When the by-pass request is selected, the data of the move-in register 22 is transferred to the word register 8. When data is set to the move-in registers 22 and 23, the move-in request data is generated. After the move-in request is selected, the control information (for example, a partially valid request with regard to the data of the move-in registers 22 and 23) is written into the tag portion 4 and next, the data of the move-in registers 22 and 23 is written into the data portion 6 through a buffer write register. In the move-in operation, a data write operation for the buffer storage is carried out at each unit of 16 bytes.

As is apparent from FIG. 3A, a blank cycle occurs between a priority cycle P (BYP) in which the by-pass request is selected and a priority cycle P (Mi) in which the first move-in request is selected. In FIG. 3B, case (1) shows the process when a fetch request is selected for the blank cycle. The request considered pertains to the fact that a data "b" succeeding a data "a" is requested. P (FCH) shows a priority cycle in which the fetch request is selected. The request is processed in sequence by a pipeline processing sequence, then at a T cycle, since tag information of the data "b" is not yet written in the tag portion 4, a line missing detect (LMD) signal is output, and the request of the buffer is recycled. At the start of cycle-10, the data "b" is set to the word register 8. A status valid (STV) signal shows that the requested data has been validated.

The above-described case (1) is a prior art type processing, and case (2), described below, is a processing procedure in accordance with the present invention.

In the present invention, at the time interval from the a priority cycle to a first priority cycle P (Mi) completion (the first move-in (MI)-end data is "1") an INH-P data (a priority inhibit signal) is kept "1" and the request is always input into the pipeline. In accordance with the present invention, the data "b" can be set to the word register 8 every 8 cycles, and therefore, case (2) can deliver requested data 2 cycles faster than in case (1).

As other embodiments of the present invention, the following two cases are carried out.

(1) During the period from the end of the priority cycle P (BYP) to the first ending of priority cycle P (MI), only data of the by-pass-request which has been prioritized to select, and data of the by-pass request which is not yet prioritized to select are incoming in series (e.g. just as data of the address No. 1 and data of the address No. 2, a data INH-P may be devised to be "1".

(2) Regardless of the succession of data when a priority cycle P (BYP) is received, during the period from the termination of the priority cycle P (BYP) to the termination of the first time priority cycle P (MI), the data INH-P may be devised to be "1".

Although certain preferred embodiments have been shown and described, it should be understood that many changes and modifications may be made therein without departing from the scope of the appended claims.

We claim:

1. A buffer storage control system including a central processing unit and a main storage for storing data, comprising:
    buffer storage means for storing a part of the data of the main storage; and
    at least one of an arithmetic means and an instruction processing means, each for processing data;
    means for transferring data to be processed directly to said one of said arithmetic means and said instruction processing means by a by-pass operation when a block transfer of data from the main storage means to the buffer storage is carried out;
    means for writing said transferred data into said buffer storage means and when not all of the data of one block is written into said buffer storage means, only the data written in said block transfer can be read; and
    means for inhibiting access to said buffer storage means during a period from an end of the by-pass operation to an end of the writing of said transferred data into said buffer storage means with respect to data related to said by-pass operation and data transferred from said main storage subsequent to said data related to said by-pass operation, based upon a subsequent request for access.

2. A buffer storage control system according to claim 1, further comprising setting means for setting a priority inhibit signal to "1" during a period from an end of a priority by-pass cycle to an end of a first priority move-in cycle.

3. A buffer storage control system according to claim 2, wherein said setting means includes means for setting the priority inhibit signal to "1" only when a prioritized by-pass request data and a not-yet-prioritized request data appear successively during said period.

4. A method for controlling a buffer storage for storing and transferring data, comprising the steps of:
   (a) storing a part of data stored in a main storage into a buffer storage;
   (b) transferring the data directly to a central processing unit utilizing a by-pass operation;
   (c) writing said transferred data into said buffer storage, wherein only the transferred data can be read when not all of the data are written into said buffer storage; and
   (d) inhibiting access to said buffer storage during a period from an end of a by-pass operation to an end of the writing of said transferred data into said buffer storage with respect to data related to said by-pass operation and data transferred from said main storage, based upon a subsequent request for access.

5. A method according to claim 4, wherein the steps of storing and transferring of the data are performed in response to priority signal request, and said method further comprising the steps of:
   (e) setting a priority by-pass cycle and priority move-in cycle;
   (f) outputting the priority inhibit signal; and
   (g) setting the priority inhibit signal to "1" during a period from an end of a priority by-pass cycle to an end of a first priority move-in cycle.

6. A method according to claim 5, further comprising the step of setting the priority inhibit signal to "1," only when by-pass request data is prioritized and data of a by-pass request which is not yet prioritized appear successively during said period from an end of a priority by-pass cycle to an end of a first priority move-in cycle.

* * * * *